United States Patent [19]

Courbot

[11] 4,210,233

[45] Jul. 1, 1980

[54] CLUTCH ASSEMBLY

[75] Inventor: Pierre Courbot, Villiers le Bel, France

[73] Assignee: Société Anonyme DBA, Paris, France

[21] Appl. No.: 896,839

[22] Filed: Apr. 17, 1978

[30] Foreign Application Priority Data

May 10, 1977 [FR] France ................. 77 14231

[51] Int. Cl.² ............................................ F16D 13/50
[52] U.S. Cl. ............................... 192/89 B; 192/70.27; 403/316
[58] Field of Search ........................... 192/89 B, 70.27; 403/315, 316

[56] References Cited

U.S. PATENT DOCUMENTS

| | | | |
|---|---|---|---|
| 3,123,187 | 3/1964 | Welsh | 403/316 X |
| 3,283,864 | 11/1966 | Motsch | 192/70.27 X |
| 3,300,007 | 1/1967 | Motsch | 192/89 B X |
| 4,109,368 | 8/1978 | Hubbard et al. | 192/89 B X |

FOREIGN PATENT DOCUMENTS

| | | | |
|---|---|---|---|
| 2613048 | 10/1976 | Fed. Rep. of Germany | 192/89 B |
| 1443367 | 7/1976 | United Kingdom | 192/89 B |

*Primary Examiner*—Rodney H. Bonck
*Attorney, Agent, or Firm*—Paul David Schoenle; Ken C. Decker

[57] ABSTRACT

A friction clutch assembly comprising a resilient annular member adapted to be engaged by a clutch release bearing to control axial movement of a pressure plate relative to a cover is disclosed. The resilient annular member comprises tabs which extend axially through apertures in the cover to provide said annular member with a fulcrum. Each tab defines a free end which is bent before assembly and resiliently deformable in an axial direction, whereby the cover is axially prestressed by the tabs after assembly. In a preferred embodiment of the invention, the apertures comprise a first portion permitting axial introduction of the tabs and a second portion permitting rotation of the annular member in a given direction relative to the cover, bent portions of the cover preventing the annular member from rotating in the reverse direction. In another embodiment, a locking ring is inserted between the free ends of the tabs and the cover to prevent the tabs from escaping through the apertures.

8 Claims, 10 Drawing Figures

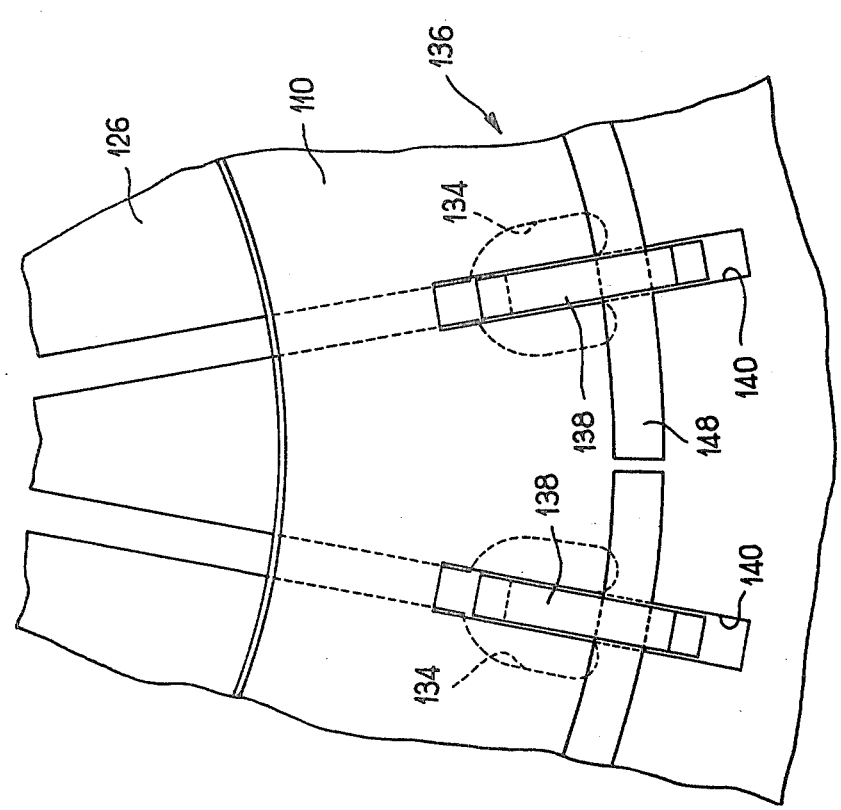
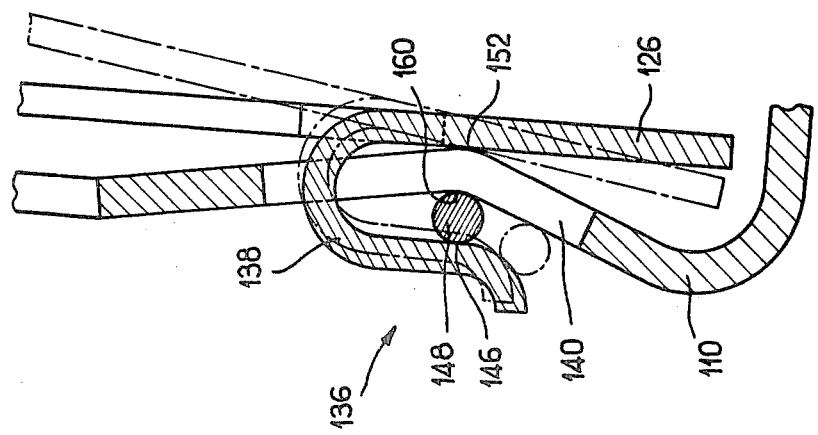

CLUTCH ASSEMBLY

The invention relates to a clutch assembly for use in a friction clutch of the type used in motor vehicles, and to a clutch including such an assembly.

More particularly, the invention relates to a clutch assembly comprising a cover-forming member rotationally connected to a pressure plate and axially movable relative thereto, and a resilient annular member comprising an outer peripheral portion axially connected to the pressure plate and a central portion adapted to be engaged by operating means, fulcrum means being provided between the resilient member and the cover-forming member, said resilient member being adapted to pivot around said fulcrum means to axially shift the pressure plate relative to the cover-forming member in a clutch actuating direction on actuation of the operating means, the fulcrum means comprising tabs extending axially from a first one of said members through corresponding apertures in the second member.

In conventional clutch assemblies of this type, the tabs which allow the resilient annular member, usually called "diaphragm", to pivot relative to the annular cover-forming member are formed on the latter, and the diaphragm is prevented from escaping either by adding an additional element at the base of the tabs, on which the diaphragm comes to bear, or by bending the end of the tabs. Either way, locking may be accompanied by resilient stressing obtained by crimping the tabs on to the diaphragm so as to take up the wear which generally occurs on the surfaces in contact on the diaphragm and on the cover-forming member.

However, these various known solutions, all of which have the advantage of preventing the creation of play due to wear on the surfaces in contact on the diaphragm and cover-forming member, have the disadvantage that assembly of them is relatively difficult and demands relatively complicated tools. The initial tension which must be applied to the ends of the tabs on the cover-forming member must be accurately determined, allowing for the resilient force exerted by the diaphragm, for the possibility of the diaphragm in relation to its supports and for the play which must be taken up during the lift of the clutch. Consequently crimping of the tabs must be carried out very accurately, and so special care is required during assembly.

The invention proposes to overcome the disadvantages inherent in the known clutch assemblies while preserving the advantages of the solutions just mentioned.

To this end, a clutch assembly of the type defined above is characterised in that the free end of each tab is bent radially before assembly of said members to define an axial gap adapted to receive at least one portion of the second member after assembly, each aperture in the second member comprising at least one first portion permitting axial introduction of the corresponding tab, at least one locking element being provided to prevent the tabs from escaping through said apertures after their introduction, the respective dimensions of said axial gap and of said portion of the second member before assembly being such that said portion of the second member is prestressed in said gap after assembly.

As a result, the initial tension applied to the tabs can be determined very accurately during production of the member on which they are formed. Also, assembly is much easier, being done merely by relative rotation of the cover-forming member and diaphragm, followed by positioning of the locking element.

According to a preferred embodiment of the invention, the locking element may comprise at least one bent portion of one of the same members. The clutch assembly is thus made as simple as possible, since the diaphragm and cover-forming member are assembled without adding any other components.

Still according to this preferred embodiment of the invention, the tabs may be formed on the resilient member and the apertures may be in the cover-forming member.

The invention also relates to a clutch comprising, in particular, a clutch assembly of this kind.

The invention will now be described, by way of example, with reference to the accompanying drawings, in which:

FIG. 9 is an enlarged partial section through another embodiment of the diaphragm and cover-forming member, showing them in the position which they occupy when locked with a resilient ring; and FIG. 10 is an elevation of the diaphragm and cover-forming member represented in FIG. 9;

Figure 1:
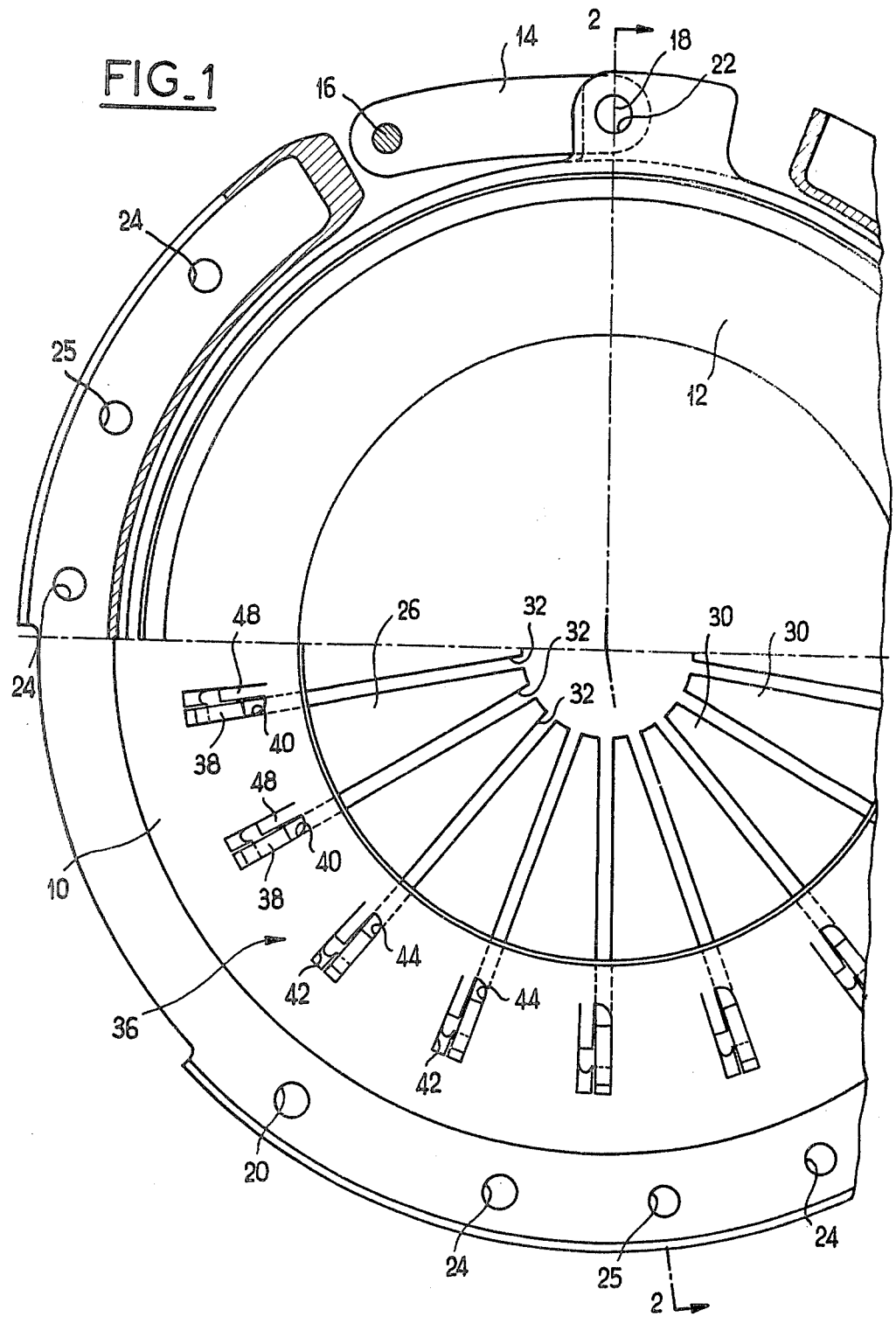
FIG. 1 is an elevation of a clutch assembly embodying the invention, the upper portion of said assembly being shown in section.
Figure 2:
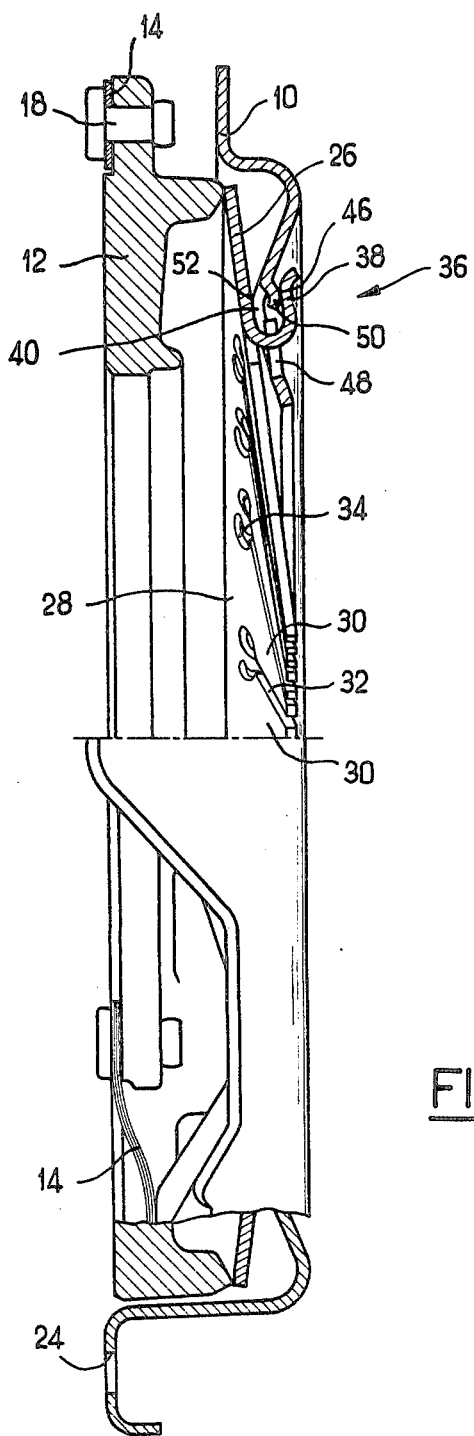
FIG. 2 represents an axial section through this clutch assembly along a line 2—2 in FIG. 1.

The clutch assembly illustrated in FIGS. 1 and 2 comprises an annular cover-forming member 10 rotationally connected to a pressure plate 12 by resilient tongues 14, of which only one is shown and which extend in a substantially circumferential direction between rivets 16, 18 or the like, which pass through respective holes 20, 22 in the cover 10 and the pressure plate 12. The tongues 14 permit some axial motion of the pressure plate 12 relative to a flywheel (not shown) designed to be fixed to the cover 10 by screws or the like (not shown) passing through holes 24 in the cover, the flywheel being centered by means of centering rods (not shown) which pass through holes 25 in the cover.

The pressure plate 12 is normally urged axially toward the flywheel (not shown) by a resilient annular member or diaphragm 26, in order to clamp a driven plate (not shown), which is interposed between the pressure plate and flywheel and is movable axially relative to them.

The diaphragm 26 mainly comprises an outer peripheral portion 28, the outer edge of which is in contact with the pressure plate 12, and a central portion formed of radial fingers 30 separated by open slots 32 which end in enlarged apertures 34 defining the inner periphery of the portion 28 of the diaphragm.

Operating means (not shown), such as a conventional clutch release bearing, can urge the ends of the fingers 130 axially to the left in FIG. 2 to move the pressure plate 12 away from the flywheel (not shown).

To enable the thrust exerted by the operating means on the fingers 30 of the diaphragm 26 to be transmitted to the pressure plate 12, fulcrum means generally designated 36 are provided between the diaphragm and the cover 10, approximately level with the enlarged apertures 34 in the diaphragm.

In accordance with the invention, the fulcrum means 36 comprise tabs 38 which begin in the diaphragm 26 at the bases of the enlarged apertures 34 and are obtained during punching of the slots 32 in such a way that they are situated in the extensions of the slots and are substantially the same width as the slots. The tabs 38 extend axially into apertures 40 in the cover 10 and substantially form hooks of which the free ends are bent radially outward to form a portion substantially parallel to the base of the tab, i.e., to the portion 28 of the diaphragm, to form an axial gap adapted to receive the corresponding portion of the cover 10. In order to permit an easier assembly of the clutch, the free end of each tab bent away from the cover 10.

In the embodiment shown in FIGS. 1 and 2, each aperture 40 has a first portion 42 permitting axial introduction of the tab 38 facing it, and a second portion 44 permitting relative rotation of the diaphragm 26 and cover 10 so as to bring the end of each tab 38 opposite a bearing surface 46 on the cover 10. The first portion 42 of each aperture 40 is formed by a substantially straight radial slot capable of being at least partly blocked by a bent portion 48 of the cover, constituting a locking element which can prevent the tabs 38 from returning opposite the first portion 42 of each aperture 40. The slots 42 are slightly wider than the tabs 38, and their length before blocking by the bent portion 48 is sufficient to allow the tabs 38 to pass through easily.

In the embodiment illustrated, each bent portion 48 is connected to the cover 10 by the inner end of the corresponding slot 42, so that the base of the portion 48 before it is bent into the aperture portion 42 forms one end of the aperture.

The second portion 44 of each aperture 40 comprises a circumferential extension of the first portion 42 which is shorter than the latter before it is blocked by the portion 48 and which extends radially between the base of the bent portion 48 and a lug 50 on which the bearing surface 46 is formed. Each lug 50 begins substantially at the outer radial end of its slot 42 and is bent axially toward the end of the associated tab 38 to define a bearing surface 46 whose cross-section is rounded to facilitate pivoting of the tabs 38 of the diaphragm 26 relative to the cover 10. Also, the cover 10 is bent along its entire circumference level with the surfaces 46 to define an annular bearing surface 52, also of rounded cross-section, cooperating with the diaphragm 26 at the base of the tabs 38 so that the distance from the bearing surface 46 to the annular surface 52 exceeds the gap separating the end of each tab 38 from the portion facing it on the diaphragm 26 before assembly. Preferably, the bearing surfaces 46, 52 have cross-sections shaped like concentric circular arcs of identical radius, so that the distance separating these surfaces remains constant irrespective of the orientation of the diaphragm 26 relative to the cover 10.

Furthermore, the tabs 38, slots 32 and apertures 34 in the diaphragm 26 may be obtained by a single punching and bending operation which makes it possible to predetermine the initial tension which will exist at the fulcrum means 36 between the diaphragm 26 and the cover 10 after assembly of the latter components. Similarly, the apertures 40, bent portions 48, lugs 50 and annular surface 52 may be obtained in a single pressing operation during the maufacture of the cover 10.

Figure 8:
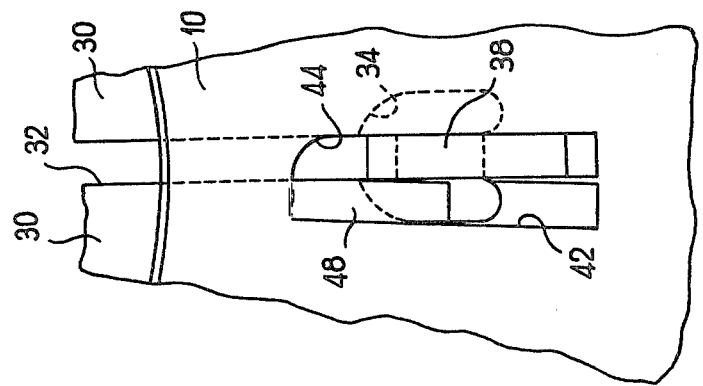
FIG. 8 is a view identical to FIG. 5 and illustrates the diaphragm and cover-forming member in the position shown in FIG. 7.

Assembly of the cover 10 and the diaphragm 26 by way of the fulcrum means 36 will now be described with reference to FIGS. 3 and 8.

Figure 5:
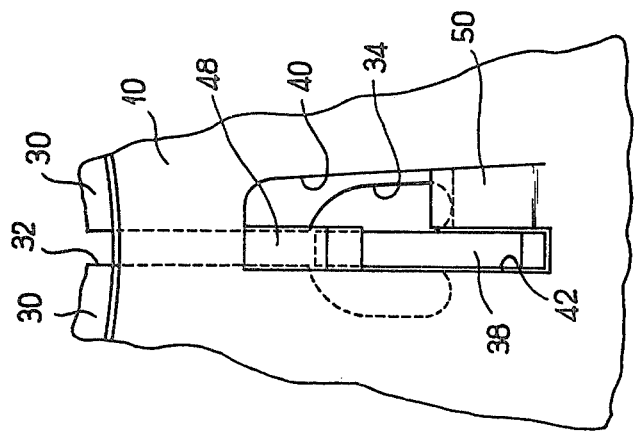
FIG. 5 is an elevation of the diaphragm and cover-forming member in the position shown in FIG. 4.
Figure 4:
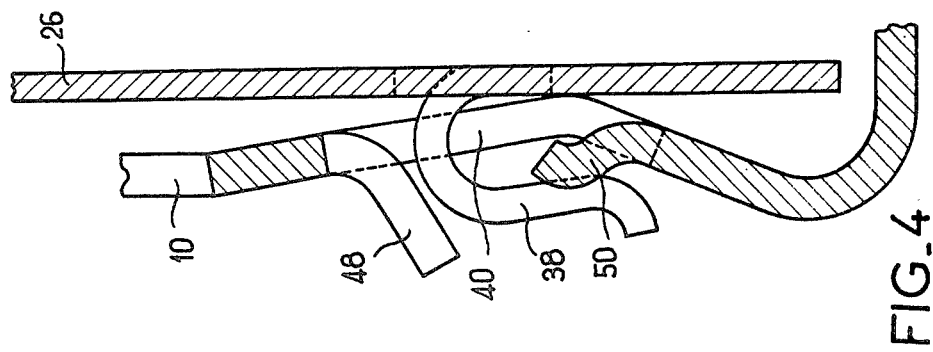
FIG. 4 is a view identical to FIG. 3 showing the diaphragm and cover-forming member in the position which they occupy after being fitted together.
Figure 3:
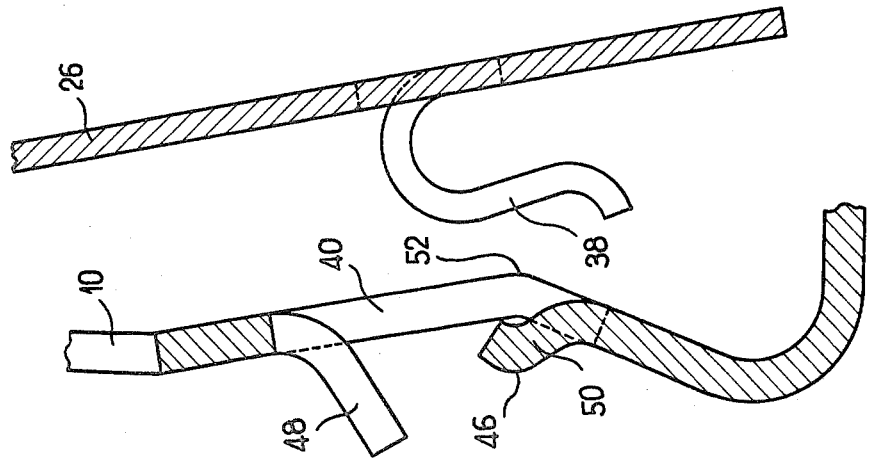
FIG. 3 is an enlarged partial section through the diaphragm and cover-forming member, showing them in the positions which they occupy before being assembled.
Figure 7:
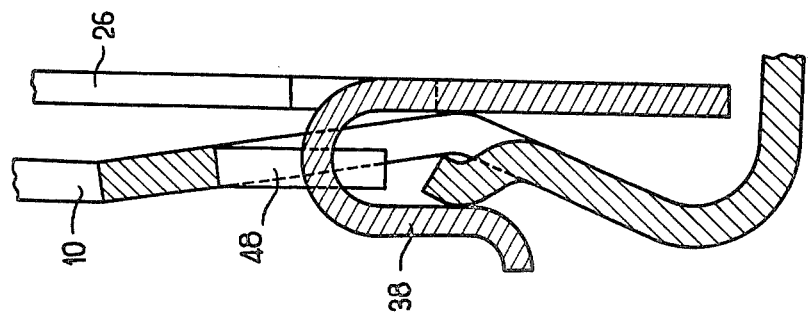
FIG. 7 is a view identical to FIGS. 3, 4 and 6 showing the diaphragm and cover-forming member in the position which they occupy after locking.
Figure 6:
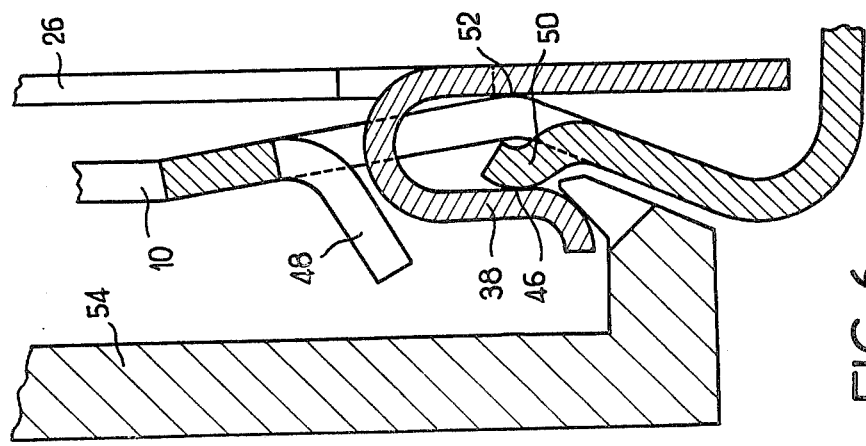
FIG. 6 is a view identical to FIGS. 3 and 4, showing the diaphragm and cover-forming member in the position which they occupy after relative rotation therebetween.

FIG. 3 shows the diaphragm 26 and cover 10 in the position which they occupy after pressing but before the assembly operation has started. In this condition, the general configuration of the diaphragm 26 is substantially conical, the portions 48 are bent away from the diaphragm 26 so that the tabs 38 can be introduced into the portions 42 of the apertures 40, and the gap defined in the idle position between the end of each tab and the tab base is less than the distance separating the bearing surfaces 46, 52. FIGS. 4 and 5 show the first assembly phase, during which the tabs 38 are inserted in the portions 42 of the apertures 40. This operation cannot take place until the diaphragm 26 has been brought into a substantially plane position, as indicated clearly in FIG. 4. FIG. 6 represents the next phase in assembly, during which lugs on an appropriate tool 54 are inserted between the ends of the tabs 38 and the cover 10 to draw the tab ends further away from the diaphragm 26, which, near the bases of its tabs 38, is resting on the annular surface 52 on the cover 10. This operation is possible because the tabs 38 are resiliently deformable in an axial direction. Once the tab ends have been drawn away, the cover 10 and diaphragm 26 are turned relative to one another so that the ends of the tabs 38 engage the abutment surfaces 46 on the lugs 50. Lastly, as FIGS. 7 and 8 show, the last phase in assembling the cover 10 and diaphragm 26 comprises pushing down the bent portions 48 of the cover 10 into the slots 42, and so preventing the tabs 38 from returning opposite the slots 42.

The operation of the clutch assembly just described is similar to that of conventional clutches of this type and may be summarized as follows.

When the various components of the clutch assembly are idle, they occupy the positions shown in FIGS. 1 and 2. When the assembly is attached to the rest of the clutch, initial tension is imparted to the diaphragm 26 so that it occupies a substantially plane position when the clutch is engaged. The diaphragm 26 then acts as a spring and urges the pressure plate 12 axially toward the flywheel (not shown), so connecting the pressure plate and flywheel rotationally to an axially movable driven plate or disc (not shown) situated between them. When the driver of the vehicle wishes to declutch, he operates the clutch pedal, causing the inner peripheral portions of the fingers 30 of the diaphragm 26 to be urged to the left in FIG. 2 by way of a clutch release bearing (not shown). Because the diaphragm is pivotably supported between the bearing surfaces 46 on the lugs 50 and the circumferential bearing surface 52 on the cover 10, the outer peripheral edge of the diaphragm portion 28 is urged to the right in FIG. 2, causing the pressure plate 12 to move away from the flywheel so that the frictional engagement between the pressure plate, driven plate and flywheel is at least partly released and the mechanism is at least partly disengaged. When the driver of the vehicle releases the clutch pedal, the clutch release bearing (not shown) is moved back to the right in FIG. 2, so that the various components of the mechanism resume their engaged positions under the influence of the resilience stored in the diaphragm 26, which then acts in much the same way as a Belleville spring washer.

In the embodiment illustrated in FIGS. 9 and 10, elements like the elements described with reference to FIGS. 1 to 8 bear the same reference numerals plus 100.

FIGS. 9 and 10 are partial illustrations on a larger scale of a clutch cover 110 attached to a diaphragm 126 by fulcrum means 136, and their essential difference from the first embodiment lies in the fulcrum means 136. As in the first embodiment, the fulcrum means comprise tabs 138 which begin in the diaphragm 126 at the bases of enlarged apertures 134 and are shaped substantially like hooks of which the end is bent radially outward. Each tab 138 extends radially into an aperture 140 formed in the cover and essentially comprising a substantially straight radial slot slightly wider than the tabs 138 and long enough to allow the tabs to pass through freely when the diaphragm 126 is substantially flat.

In the embodiment shown in FIGS. 9 and 10, the locking element which prevents the tabs 138 from escaping after assembly is an open O-ring 148 inserted between the ends of the tabs and a concave annular surface 160 formed on the cover 110 in the vicinity of the apertures 140. Preferably, the concave surface 160 is obtained by bending the metal sheet constituting the cover 110 simultaneously with formation of an annular, rounder bearing surface 152, with which the diaphragm 126 cooperates at the base of the tabs 138. The O-ring 148 also defines an annular bearing surface 146, which is substantially aligned axially with the surface 152 and on which the tabs 138 come to bear. In accordance with another embodiment of the invention, not shown, the O-ring 148 could be replaced by any other open annular member. In particular, the cross-section of such an annular member might be such that the annular bearing surface defined by this member and the annular bearing surface 152 formed on the cover are in cross-section concentric circular arcs of identical radius, so that the distance between these surfaces remains constant irrespective of the inclination of the diaphragm relative to the cover.

According to the invention, the distance separating the ends of the tabs 138 and the diaphragm portions facing them in the idle position is less than the axial distance separating the bearing surfaces 146 and 152, so that the stress which exists after assembly between the diaphragm and cover at these supports is determined before assembly.

The various steps in assembly are indicated diagrammatically in FIG. 9, in which chain-lines show the position occupied by the diaphragm before it is fitted to the cover, but after the tabs 138 have been inserted in the apertures 140. Other chain-lines show the position occupied by the O-ring 148 during assembly, whereas solid lines show the positions of the diaphragm 126, cover 110 and O-ring 148 after assembly. Note in particular, that the distance from the free end of the tabs to the cover after assembly is less than the diameter of the O-ring 148, with the result that the latter cannot escape accidentally.

It will be appreciated that in any of the embodiments just described the component directed toward the clutch axis of the initial tension existing before assembly at the fulcrum means 36 or 136 exceeds the force exerted by the clutch release bearing on the diaphragm in order to limit the travel of the bearing.

Obviously, the invention is not restricted to the embodiments just described by way of example. In particular, tabs similar to the tabs 38 or 138 may be associated with the cover to cooperate with apertures similar to the apertures 40 or 140 formed in the diaphragm. Also, the number of tabs and of corresponding apertures may differ from the number of slots 32 or 132 in the diaphragm without thereby exceeding the scope of the invention. Moreover, the shape of the tabs and apertures may also be different from those described by way of example, and it will be appreciated that it is not essential to provide a bent portion like the portion 48 for every one of the apertures 40 in the first embodiment. Finally, the resiliency of the tabs may be combined with or even replaced by resiliency of the cover portion received in the gap defined by the tabs.

What we claim is:

1. A clutch assembly comprising a cover-forming member rotationally connected to a pressure plate and axially movable relative thereto, and a resilient annular member comprising an outer peripheral portion axially connected to the pressure plate and a central portion adapted to be engaged by operating means, fulcrum means being provided between the resilient member and the cover-forming member, said resilient member being adapted to pivot around said fulcrum means to axially shift the pressure plate relative to the cover-forming member in a clutch actuating direction on actuation of the operating means, the fulcrum means comprising tabs extending axially from a first one of said members through corresponding apertures in the second member, wherein a free end of each tab is bent radially before assembly of said members to define an axial gap adapted to receive at least one portion of the second member after assembly, each aperture in the second member comprising at least one first portion permitting axial introduction of the corresponding tab, at least one locking element being provided to prevent the tabs from escaping through said apertures after their introduction, the respective dimensions of said axial gap and of said portion of the second member before assembly being such that said portion of the second member is prestressed in said gap after assembly, each aperture further comprising a second portion permitting relative rotation of said members in a first direction after the tabs have been introduced in the first portions of said apertures, the dimensions of said second portion of each aperture being adapted to prevent the tabs from escaping axially, said locking element being adapted to prevent said members from rotating in a direction opposite said first direction.

2. A clutch assembly according to claim 1, wherein said locking element comprises at least one bent portion of the second member adapted to block the first portion of at least one of said apertures.

3. A clutch assembly according to claim 1, wherein bearing surfaces of rounded cross-sections are provided on said second member to pivotally cooperate with the first member at the free ends and bases of the tabs.

4. A clutch assembly comprising:
   a pressure plate;
   a cover rotationally connected to said pressure plate, axially movable relative thereto, and adapted to be fixed to a flywheel;

a resilient annular member comprising an outer peripheral portion engaging said pressure plate and a central portion formed of radial fingers separated by open slots and adapted to be engaged by clutch operating means; and fulcrum means provided between said cover and said resilient annular member to enable a thrust exerted by said clutch operating means to be transmitted to said pressure plate;

said fulcrum means comprising tabs extending axially from said resilient annular member through corresponding apertures in said cover;

said tabs extending from closed ends of said open slots and comprising free ends which are bent radially outward to prevent the tabs from escaping through said apertures.

5. A clutch assembly according to claim 4, wherein at least one locking element is provided to lock the tabs in an assembly position relative to said cover.

6. A clutch assembly according to claim 5, wherein the free end of each tab is bent before assembly of said cover with said resilient annular member, each said aperture comprising at least one first portion permitting axial introduction of the corresponding tab, the free ends of said tabs being resiliently deformable in an axial direction whereby said cover is axially prestressed by said tabs after locking of the latter by said locking element.

7. A clutch assembly according to claim 6, wherein each tab defines a free end which is bent before assembly and resiliently deformable in an axial direction, whereby said cover is axially prestressed by said tabs after locking of the latter by said locking means.

8. A clutch assembly comprising:
a pressure plate;
a cover rotationally connected to said pressure plate, axially movable relative thereto, and adapted to be fixed to a flywheel;
a resilient annular member comprising an outer peripheral portion engaging said pressure plate and a central portion formed of radial fingers separated by open slots and adapted to be engaged by clutch operating means; and
fulcrum means provided between said cover and said resilient annular member to enable a thrust exerted by said clutch operating means to be transmitted to said pressure plate;
said fulcrum means comprising tabs extending axially from said resilient annular member through corresponding apertures in said cover;
each aperture comprising a first portion permitting axial introduction of the corresponding tab and a second portion permitting rotation of said resilient annular member relative to said cover in a first direction, the dimensions of said second portion being adapted to prevent the tabs from escaping axially, and locking means being adapted to prevent said members from rotating in a direction opposite said first direction.

* * * * *